(12) United States Patent
Shih

(10) Patent No.: US 7,821,684 B2
(45) Date of Patent: Oct. 26, 2010

(54) CIRCUIT MODULE INTEGRATING A LIGHT DRIVER AND AN OPTICAL

(76) Inventor: Chen-Hsiang Shih, No. 37-3, Yung-Feng Lane, Ho-Ming Village, Hsui-Shui Hsiang, Chang-Hua Hsien (TW)

(*) Notice: Subject to any disclaimer, the term of this patent is extended or adjusted under 35 U.S.C. 154(b) by 1628 days.

(21) Appl. No.: 10/063,436

(22) Filed: Apr. 23, 2002

(65) Prior Publication Data
US 2003/0202223 A1    Oct. 30, 2003

(51) Int. Cl.
*H04N 1/04* (2006.01)
(52) U.S. Cl. .......... 358/497; 358/483; 358/482; 358/445; 358/443; 358/475; 358/474
(58) Field of Classification Search .......... 358/475, 358/482, 483, 497, 494, 474, 443, 487, 509, 358/505, 506, 445, 300; 315/74, 106; 313/236; 257/434, 433, 680, 723, 292; 250/208.1, 250/216, 239, 234–236; 382/312, 313, 318, 382/319
See application file for complete search history.

(56) References Cited

U.S. PATENT DOCUMENTS

| | | | | |
|---|---|---|---|---|
| 4,549,223 A | * | 10/1985 | Ozawa | 358/300 |
| 4,881,014 A | * | 11/1989 | Okochi | 315/246 |
| 5,319,182 A | * | 6/1994 | Havens et al. | 235/462.42 |
| 5,646,484 A | * | 7/1997 | Sharma et al. | 315/74 |
| 6,014,231 A | * | 1/2000 | Sawase et al. | 358/482 |
| 6,104,510 A | * | 8/2000 | Hu et al. | 358/509 |
| 6,462,821 B1 | * | 10/2002 | Borton et al. | 356/446 |
| 6,512,603 B2 | * | 1/2003 | Saito | 358/509 |
| 6,756,617 B2 | * | 6/2004 | Koizumi | 257/292 |
| 6,762,796 B1 | * | 7/2004 | Nakajoh et al. | 348/340 |
| 6,864,999 B1 | * | 3/2005 | Fujimoto et al. | 358/472 |
| 6,945,462 B2 | * | 9/2005 | Tsukuda et al. | 235/462.06 |
| 2002/0179988 A1 | * | 12/2002 | Chiu | 257/434 |
| 2004/0200978 A1 | * | 10/2004 | Kamijo | 250/458.1 |

FOREIGN PATENT DOCUMENTS

| | | | | |
|---|---|---|---|---|
| JP | 04023360 A | * | 1/1992 | |
| JP | 09321597 A | * | 12/1997 | |
| JP | 2006325024 A | * | 11/2006 | |

* cited by examiner

*Primary Examiner*—Cheukfan Lee
(74) *Attorney, Agent, or Firm*—Stolowitz Ford Cowger LLP

(57) ABSTRACT

A circuit module integrating a light driver and an optical scanner is capable of sensing an image of a document and driving a light source. The circuit module comprises a printed circuit board, an optical sensor and a light driver. Both the optical sensor and the light driver are mounted on and electrically connected with the printed circuit board. The optical sensor is capable of sensing the image and the light driver is capable of driving the light source.

19 Claims, 3 Drawing Sheets

CIRCUIT MODULE INTEGRATING A LIGHT DRIVER AND AN OPTICAL

BACKGROUND OF THE INVENTION

1. Field of the Invention

The invention relates in general to a circuit module integrating a light driver and an optical sensor. More particularly, the invention relates to a circuit module integrating a light driver and an optical sensor, leading the space of a scanning chassis to be reduced.

2. Description of the Related Art

Nowadays, electronic products are increasingly used to achieve many various tasks. With the development of electronics technology, miniaturization, multi-function task, and comfort of utilization are among the principle guidelines of electronic product manufacturers. As far as the profile of electronic products is concerned, lightness, thinness and smallness are the trend to design them. Therefore, there are many optical scanners with the design style having been researched. Analogical images of words or patterns can be captured using an optical scanner, and then transformed into digital signals. As a result, after the process of transforming the analogical images into the digital signals, an image file can be showed, identified, edited, saved or output by a computer or other instruments. However, in order to reduce the space of a scanning chassis, the position of arranging a light-driver circuit module and an optical-sensor circuit module on the scanning chassis must be modified.

Referring to FIG. 1 and FIG. 2, FIG. 1 is a schematically perspective view showing where the circuit module of a conventional light driver and the circuit module of a conventional optical sensor are arranged in a conventional scanning chassis; FIG. 2 is a schematically module-connection diagram showing a light-driver circuit module, an optical-sensor circuit module and a lamp are electrically connected one and another. First, as shown in FIG. 1, a scanning chassis 100 includes a light-driver circuit module 110 and an optical-sensor circuit module 120. The light-driver circuit module 110 is provided with a first printed circuit board 112 and many first electronic devices 114 mounted on the first printed circuit board 112. The first electronic devices 114 are electrically connected with the first printed circuit board 112. The first printed circuit board 112 is horizontally mounted on the left side of the scanning chassis 100. The light-driver circuit module 110 is used to drive a light source (not shown). The optical-sensor circuit module 120 is provided with a second printed circuit board 122, many second electronic devices 124 and an optical sensor 126. The second printed circuit board 122 has a first surface 128 and a corresponding second surface 130. The second electronic devices 124 are mounted on the first surface 128 and the second surface 130. The optical sensor 126 is mounted on the second surface 130 of the second printed circuit board 122 and is electrically connected with the second printed circuit board 122. The second printed circuit board 122 is vertically mounted on the rear side of the scanning chassis 100. The optical sensor 126 of the optical-sensor circuit module 120 is used to sense an image of a document.

As shown in FIG. 2, the light-driver circuit module 110 is provided with a connector 116 and, also, the optical-sensor circuit module 120 is provided with a connector 132. The two ends of two wires 140 are electrically connected with the connector 116 and the connector 132 respectively, leading the light-driver circuit module 110 to be electrically connected with the optical-sensor circuit module 120. Further, the light-driver circuit module 110 has a connector 118. The two ends of two wires 150 are electrically connected with the connector 118 and the light source 160 respectively, leading the light-driver circuit module 110 to be electrically connected with the light source 160.

As shown in FIG. 1 and FIG. 2, the light-driver circuit module 110 is separated from the optical-sensor circuit module 120. That is, the light-driver circuit module 110 is arranged on the first printed circuit board 112 and the optical-sensor circuit module 120 is arranged on the second printed circuit board 122 separated from the first printed circuit board 112. The first printed circuit board 112 and the second printed circuit board 122 are respectively mounted on different planes. When the space of the scanning chassis 100 is extremely large, it is not difficult that the two separated printed circuit boards 112, 122 are respectively mounted on the scanning chassis 100. However, when the scanning chassis 100 is designed to become small, a bottleneck of arranging, likely with the above-mentioned design style, the light-driver circuit module 110 and the optical-sensor circuit module 120 separate each other on the scanning chassis 100 with a small size must be approached.

SUMMARY OF THE INVENTION

Accordingly, an objective of the present invention is to provide a circuit module integrating a light driver and an optical sensor and thereby the space of the scanning chassis necessary for the circuit module can be reduced. As a result, the volume of the scanning chassis can be designed with a small size.

To achieve the foregoing and other objectives, the present invention provides a circuit module integrating a light driver and an optical scanner. The circuit module is capable of sensing an image of a document and driving a light source. The circuit module comprises a printed circuit board, an optical sensor and a light driver. Both the optical sensor and the light driver are mounted on and electrically connected with the printed circuit board. The optical sensor is capable of sensing the image and the light driver is capable of driving the light source.

According to a preferred embodiment of the present invention, the optical sensor can be a charge coupled device or a CMOS image sensor. The light driver can be a circuit module for switching direct current to alternating current. The light source can be a fluorescent lamp.

To sum up, the optical sensor and the light driver are integrated on the single printed circuit board, and, thus, the space of the scanning chassis necessary for the circuit module can be reduced. In addition, the optical sensor and the light driver are arranged on a same plane, and thereby it is relative efficient to employ the space of the scanning chassis.

Both the foregoing general description and the following detailed description are exemplary and explanatory only and are not restrictive of the invention, as claimed. It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. A simple description of the drawings is as follows.

DETAILED DESCRIPTION

Figure 1:
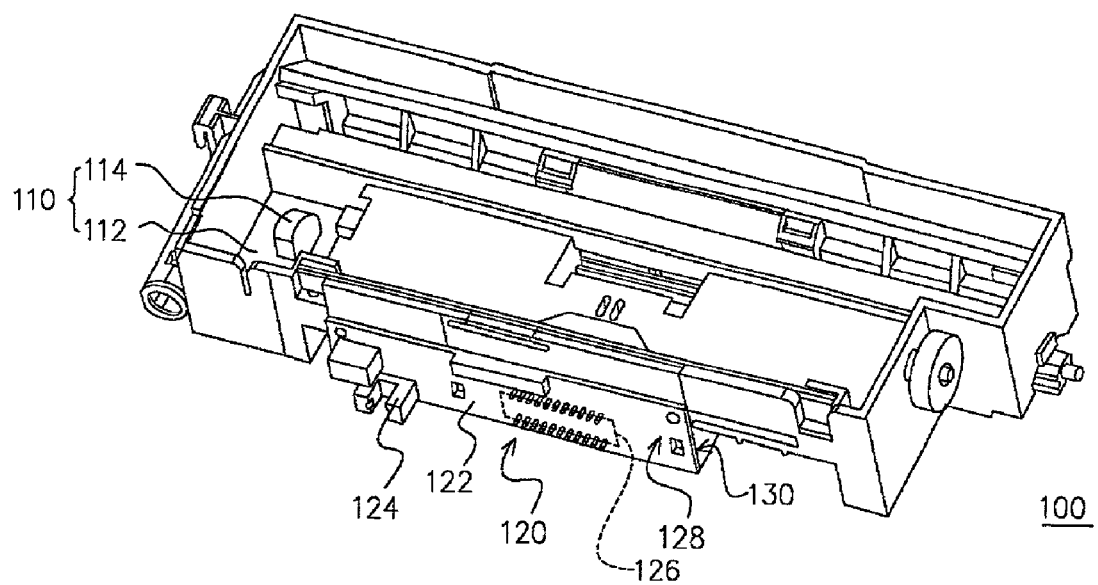
FIG. 1 is a schematically perspective view showing where the circuit module of a conventional light driver and the circuit module of a conventional optical sensor are arranged in a conventional scanning chassis.
Figure 2:
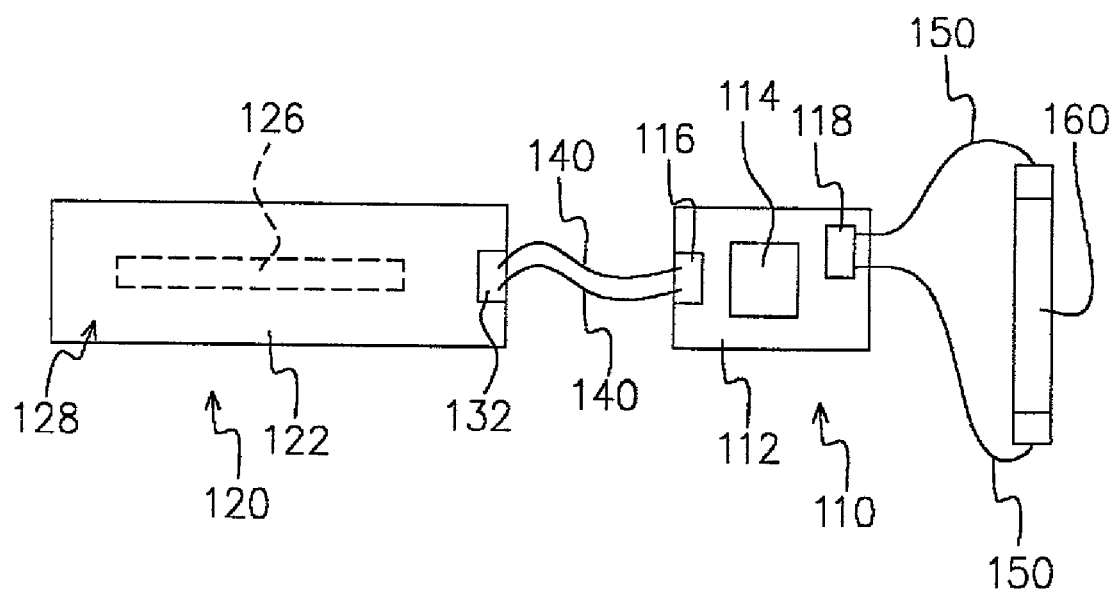
FIG. 2 is a schematically module-connection diagram showing a light-driver circuit module, an optical-sensor circuit module and a lamp are electrically connected one and another.
Figure 3:
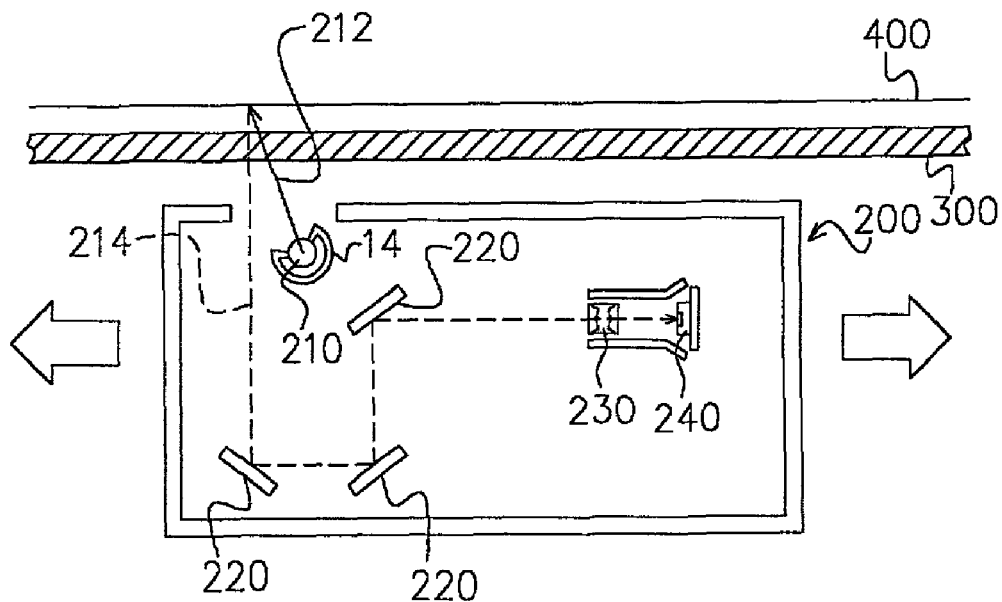
FIG. 3 is a schematic view showing the internal structure of a scanning chassis according to an embodiment of the present invention.

Referring to FIG. 3, FIG. 3 is a schematic view showing the internal structure of a scanning chassis according to an embodiment of the present invention. A scanning chassis 200 mounted under a glass panel 300 is suited for scanning a document 400 put on the glass panel 300. The scanning chassis 200 can move in a right or left direction to scan the document 400. The scanning chassis 200 includes a light source 210, three reflectors 220, a lens assembly 230 and a circuit module 240. The light source 210 is, for example, a fluorescent lamp that can emanate light 212. The light 212 can illuminate the document 400 through the glass panel 300 and an image 214 can be generated at the place where the document 400 is illuminated by the light 212. Passing through the glass panel 300, the image 214 can be projected on the reflector 220 and then the reflector 220 can reflect the image 214 in order that the image 214 can be projected on the lens assembly 230. Subsequently, the lens assembly 230 can refract the image 214 and then the refracted image 214 can be projected on the optical sensor (not shown) of the circuit module 240.

Figure 4:
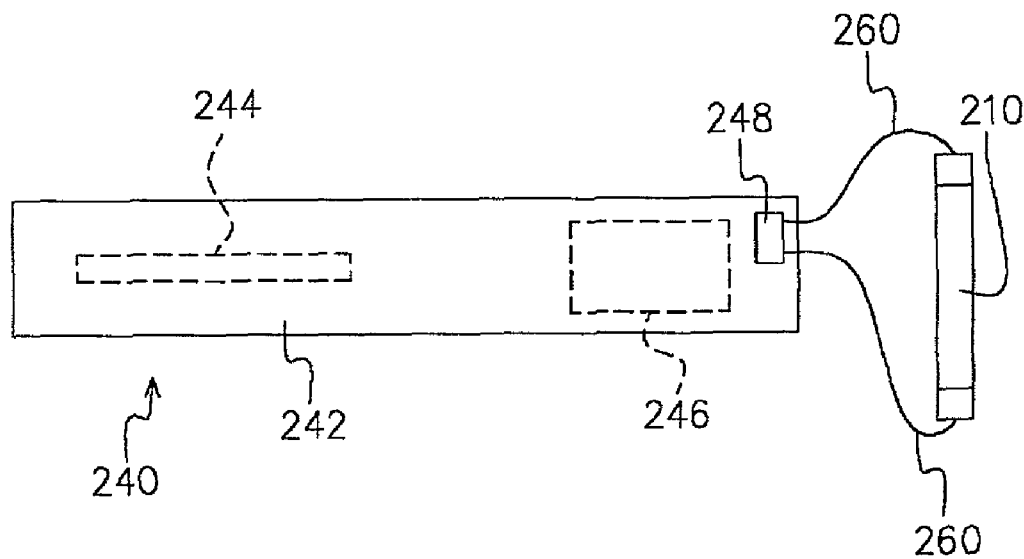
FIG. 4 is a schematic view showing a circuit module according to an embodiment of the present invention.

Referring to FIG. 3 and FIG. 4, FIG. 4 is a schematic view showing a circuit module according to an embodiment of the present invention. A circuit module 240 is provided with a printed circuit board 242, an optical sensor 244, a light driver 246 and a connector 248. Both the optical sensor 244 and the light driver 246 are mounted on and electrically connected with the printed circuit board 242. The image 214, after passing through the lens assembly 230, is projected on the optical sensor 244 of the circuit module 240. The two ends of two wires 260 are electrically connected with the connector 248 and the light source 210 respectively, leading the light driver 246 to drive the light source 210. The optical sensor 244 can be, for example, a charge coupled device (CCD) or a CMOS image sensor. The light driver 246 is a circuit module for switching direct current to alternating current.

In the above circuit arrangement, both the optical sensor 244 and the light driver 246 are integrated on the single printed circuit board 242, and, thus, the space of the scanning chassis 200 necessary for the circuit module 240 can be reduced. In addition, the optical sensor 244 and the light driver 246 are arranged on a same plane, and thereby it is relative efficient to employ the space of the scanning chassis 200.

In the above embodiment, the electronic devices of the light driver are intensively positioned on the right side of the printed circuit board. However, the present invention is not limited to the above application. The electronic devices of the light driver can be intensively mounted on any location of the printed circuit board or can be scatteringly mounted on the printed circuit board.

In addition, the above-mentioned scanning chassis is suited for the document that is not transparent. However, the present invention also can be applied to a scanning chassis capable of scanning a transparent document that is a conventional technology and, thus, that is not repeated herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A circuit module for an optical scanner, comprising:
   a circuit board;
   light driver circuitry disposed on and electrically connected with the circuit board and configured to drive a light source that illuminates a document to project an image of the document; and
   an optical sensor disposed on and electrically connected with the circuit board and configured to capture the image of the document.

2. The circuit module of claim 1, wherein the optical sensor comprises a charge-coupled device (CCD).

3. The circuit module of claim 1, wherein the optical sensor comprises a complimentary metal oxide semiconductor (CMOS) image sensor.

4. The circuit module of claim 1, wherein the light driver circuitry comprises a circuit for switching direct current to alternating current.

5. The circuit module of claim 1, wherein the light source comprises a fluorescent lamp.

6. The circuit module of claim 1, wherein the light driver circuitry and the optical sensor are disposed on the same side of the circuit board.

7. The circuit module of claim 1, wherein the light driver circuitry and the optical sensor are arranged on a common plane.

8. An apparatus, comprising:
   means for sensing an image of a document, wherein the means for sensing is disposed on and electrically connected with a circuit board; and
   means for driving a light source to illuminate the document, which projects the image of the document towards the means for sensing, wherein the means for driving is disposed on and electrically connected with the circuit board.

9. The apparatus of claim 8, wherein the means for sensing comprises a charge-coupled device (CCD).

10. The apparatus of claim 8, wherein the means for sensing comprises an image sensor.

11. The apparatus of claim 8, wherein the means for driving comprises a circuit module configured to switch direct current to alternating current.

12. The apparatus of claim 8, wherein the means for sensing and the means for driving are disposed on the same side of the circuit board.

13. The apparatus of claim 8, wherein the means for sensing and the means for driving are arranged in a common plane.

14. A scanner, comprising:
   a scanner housing;
   a circuit board located in the scanner housing;
   light driver circuitry disposed on and electrically connected with the circuit board and configured to drive a light source that produces an image of a document; and an optical sensor disposed on and electrically connected with the circuit board and configured to capture the image of the document.

15. The scanner of claim 14, wherein the optical sensor comprises a charge-coupled device (CCD).

16. The scanner of claim 14, wherein the optical sensor comprises a complimentary metal oxide semiconductor (CMOS) image sensor.

17. The scanner of claim 14, wherein the light driver circuitry comprises a circuit for switching direct current to alternating current.

18. The scanner of claim 14, wherein the light source comprises a fluorescent lamp.

19. The scanner of claim 14, wherein the light driver circuitry and the optical sensor are arranged on a common plane.

* * * * *

UNITED STATES PATENT AND TRADEMARK OFFICE
CERTIFICATE OF CORRECTION

| | | |
|---|---|---|
| PATENT NO. | : 7,821,684 B2 | Page 1 of 1 |
| APPLICATION NO. | : 10/063436 | |
| DATED | : October 26, 2010 | |
| INVENTOR(S) | : Shih | |

It is certified that error appears in the above-identified patent and that said Letters Patent is hereby corrected as shown below:

On the Title Page, item (54), under "Title", in Line 2, delete "AN OPTICAL" and insert -- AN OPTICAL SENSOR --.

Column 1, line 2 (in the Title), delete "AN OPTICAL" and insert -- AN OPTICAL SENSOR --.

Signed and Sealed this
Tenth Day of April, 2012

David J. Kappos
*Director of the United States Patent and Trademark Office*